United States Patent Office 3,285,832
Patented Nov. 15, 1966

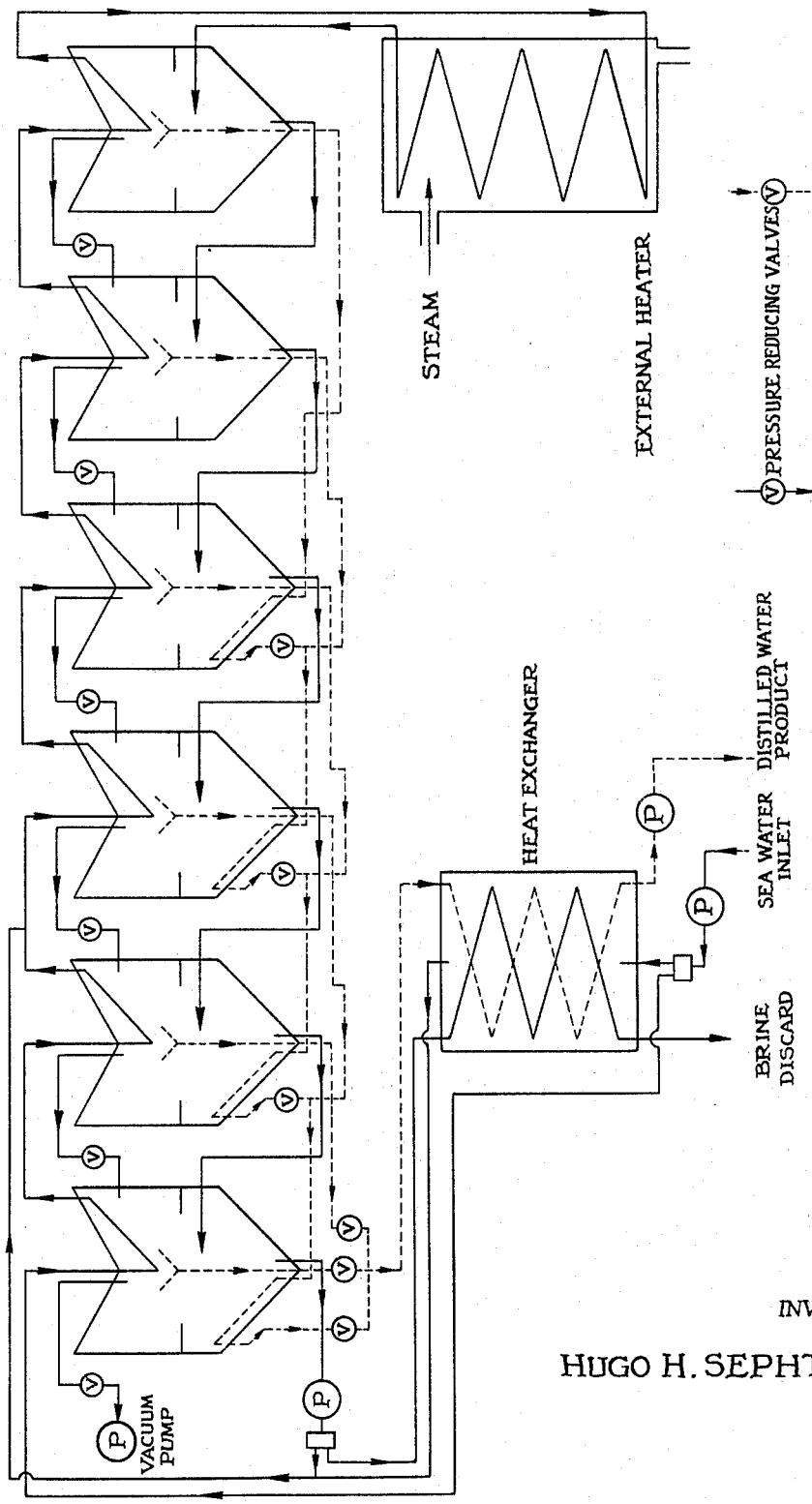

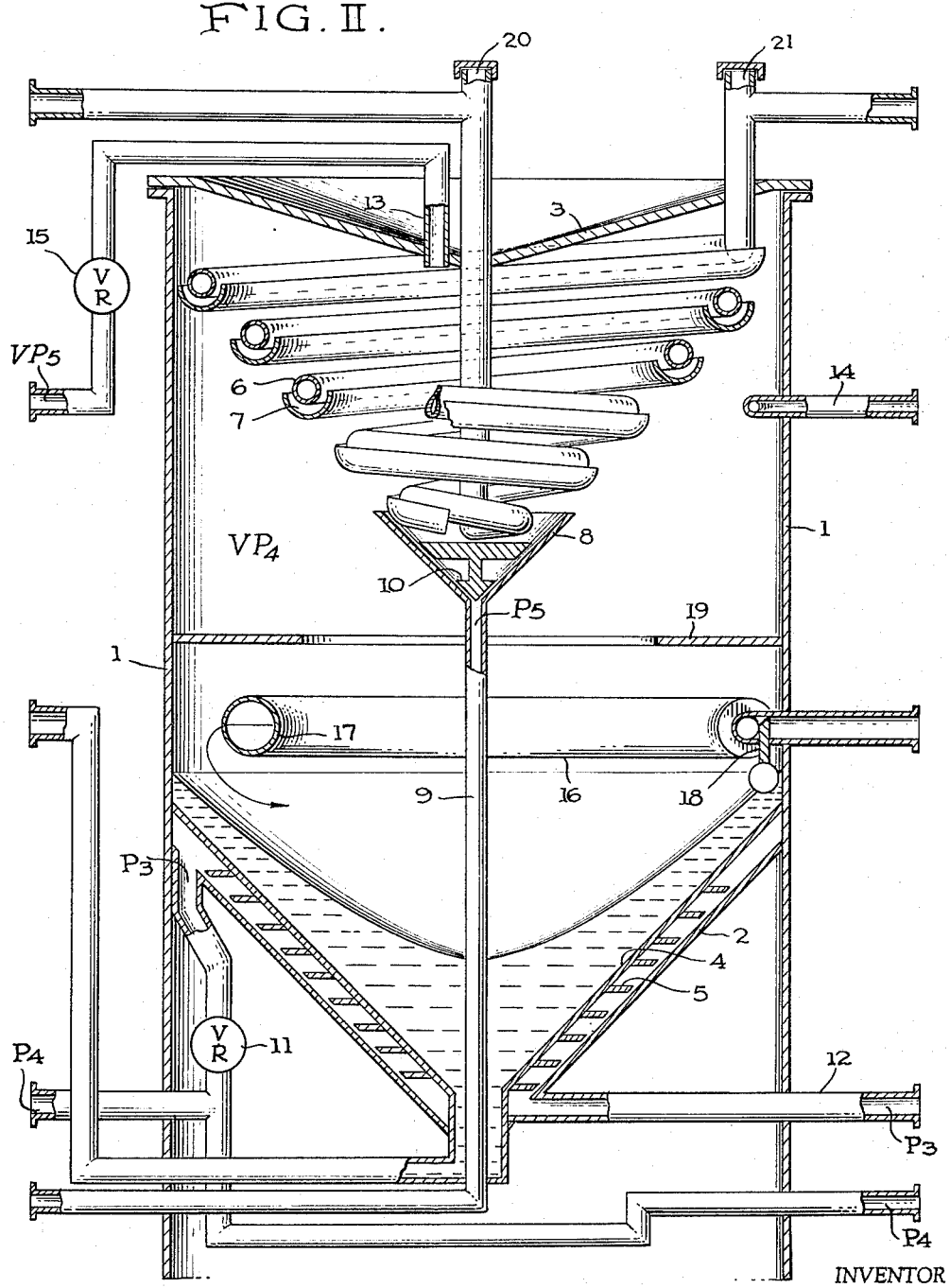

3,285,832
FLASH EVAPORATION AND CONDENSATION
APPARATUS
Hugo H. Sephton, La Jolla, Calif.
(35 Anson Way, Berkeley, Calif.)
Filed Apr. 22, 1963, Ser. No. 274,468
7 Claims. (Cl. 202—187)

This invention relates to apparatus for and to the distillation of fresh water from sea water. The apparatus is also designed to be used singly or in duplicated form in a suitable series for a flash distillation process which can be utilized for the concentration of solutions or for the distillation of solvents from a variety of solutions.

Flash evaporation processes for the conversion of fresh water from sea water are known and are in use. At the present time such processes are however economically rarely competitive with fresh water from natural sources. Improvements in such processes to result in the reduction of plant construction cost, maintenance cost and in the thermal efficiency of the process could make such processes more economical. One of the objects of this invention is to provide an apparatus and process whereby the current cost of producing fresh water from sea water by flash distillation can be reduced in terms of these factors that contribute to this cost.

A more specific object of this invention is to provide:

(a) A simple and inexpensive evaporator unit of a design which can be duplicated for use in series with the usual auxiliary equipment such as pumps, flow control valves and heat exchangers.

(b) A flash distillation unit which is simple to maintain or replace.

(c) A flash evaporator unit in which flashing is designed to take place mainly in a circular flash tube through which the hot liquid is introduced into a cylindrical evaporator unit maintained under reduced pressure.

(d) A cyclone flash distillation apparatus and process in which thermal efficiency is improved by maintaining a swirling action in the vapor as well as the liquid phase. The overall thermal efficiency of the process may also be increased by returning the heat in the distillate to the residual liquid from stage to stage to be re-utilized for the evaporation of additional residual liquid within the same cycle.

(e) A cyclone flash distillation process which, because of its dynamic nature, allows the use of relatively small evaporation units as compared to a conventional process of the same production capacity.

Other objects of this invention are indicated in the following description and as illustrated in the diagrams. It is to be understood that the diagrams and description of the process are intended to make the principles of the invention understood but that they are not intended to limit the scope of the process or to define the apparatus in exact size and/or shape.

FIGURE I is a simplified diagrammatic flow sheet of the flash distillation process as a whole incorporating a series of stages. The main purpose of the flow sheet is to illustrate how the evaporator units may be coupled in series.

FIGURE II is a vertical cross-sectional view of a flash evaporator unit or stage.

Much of the arrangement shown in FIGURE I is prior art. Thus it is common practice to lead the incoming sea water through the condensers of a series of evaporators where it is gradually heated up by absorbing heat of condensation of vapors in the series of flash evaporator units which operate at gradually increasing temperatures and vapor pressures. External heat is then usually supplied to this partially heated brine to raise its temperature to a suitable maximum value. The hot brine is then usually allowed to flow back through the bases of the series of flash evaporators where it boils spontaneously or flashes in each stage under influence of the vacuum which is increased stepwise from one evaporator unit to the next. The usual cycle is thus completed when the residual brine from the coldest evaporator unit is in part discarded, after recovery of some of its residual heat content in a heat exchanger, and is in part recycled together with fresh incoming sea water. The heat contained in the distillate is usually given up to the incoming sea water in the condenser series by fruitless refluxing and it is not utilized to evaporate additional liquid within that same cycle, but this heat is of course thus utilized in the following cycle. What is claimed to be new with regard to the flow diagram (FIGURE I) is the refinement of leading the hot condensate through a series of heat exchangers in the base of the evaporator units thus utilizing the residual heat in the condensate to effect the evaporation of extra residual liquid during the same cycle. Diagram I indicates how the fresh condensate is withdrawn from each evaporator and is allowed to bypass one (or more) evaporators whose operating temperatures are higher than the temperature of this distillate and how it is then led through the base heat exchanger of the first evaporator operating at a temperature lower than the temperature of this distillate (second next evaporator stage to the left) and thereafter through the base heat exchangers of all the remaining evaporators toward the lower temperature end of the series. Thus more distillate is capable of being obtained from a single cycle of sea water through this than through other flash distillation processes—part of the total heat cycled is used twice per cycle to effect vaporization in this process whereas all such heat is utilized once only per cycle in other processes. What is further claimed as new is the design and operation of the individual cyclone flash evaporators which are shown diagrammatically duplicated in the series in FIGURE I. The number and size of such evaporators to be used are not specified and can vary dependent on the purposes and operating conditions of a particular process. Additional evaporator units can be inserted into the flow diagram by duplicating the fourth evaporator unit (from the right) in FIGURE I. The construction and operation of a preferred form or forms of such a cyclone flash evaporator unit is illustrated in diagram II and by the following description.

The evaporator unit as illustrated in FIGURE II is generally cylindrical 1 in form with a conical base 2 and a conical lid 3 all of which may be constructed from sheet metal sufficiently strong to withstand atmospheric pressure when operated under partial vacuum. A second cone 4, of essentially the same shape as the base cone 2 but to which is welded a spiral strip 5, cut from a disc of sheet metal and draped over it, is welded to the inside walls of the evaporator. The spiral strip is designed to guide the hot distillate collected from evaporators operating at higher temperatures in the series to flow in a spiral course between the two conical plates 2 and 4. Together with these it forms the base heat exchanger. The inner cone 4 can be constructed of relatively thin metal plate to promote rapid heat exchange. It is to be understood that the effective area of the base heater can be extended to include part of the vertical sides 1 of the evaporator. It is also to be understood the that the base heat exchanger can be constructed in different ways; for instance it can be constructed of a coiled metal pipe wrapped spirally around the outside surface, and in close contact with this outside surface of the conical base 2 or it can be similarly fitted to the inside surface of the base area. In the top portion of the cylindrical body of the evaporator a condenser 6 is installed. It may be constructed of a metal pipe bent in the form of a conical spiral and suspended from the conical lid of the evaporator through which its two ends protrude, and can be connected in series with the condensers of the other evaporators in the series by suitable conduits. An open gutter 7 of a conical spiral shape similar to that of the spiral condenser 6 is suspended below it and is designed to catch the distillate which collects on the condenser tube 6 and to discharge it into the funnel 8 situated in the approximate center of the body of the evaporator. It is to be understood that the condenser can be constructed of more than one such conical spiral pipe which can be stacked inside one another and connected in series. It is also to be understood that the condenser can be constructed in a different manner; for instance, it can be constructed from two conical plates with a spiral separator between them similar to the construction of the base heat exchanger 2, 4 and 5. The funnel 8 is supported on the end of the tube 9 through which the distillate is withdrawn from the evaporator under partial vacuum. A float operated valve 10 in the throat of the funnel is designed to maintain a constant level of distillate in the funnel. A reducing valve such as 11, designed to maintain the pressure $P_5$ in tube 9 slightly above water vapor pressure at that particular temperature is located in the second next evaporator unit. Similarly, the distillate withdrawn from an evaporator two stages earlier through tube 12 is under a pressure $P_3$ larger than the pressure $P_4$ on the opposite side of the valve 11 illustrated in FIGURE II. The vapor pressure in the body of the evaporator $VP_4$ is maintained at a pressure greater than $P_5$. This series of pressure relationships through the series of evaporators is maintained by withdrawing the cooled distillate under reduced pressure at the cold end of the series with a suitable pump. Partial vacuum is created inside the body of the evaporator by pumping the air out through tube 13 which is attached to the lid of the evaporator and is located above (or behind) the condenser. In operation the evaporators may be connected in series with one another by suitable vacuum conduits 13 and 14. The vacuum inlet tube 14 enters the evaporator tangentially. Discrete steps in the vacuum (or vapor pressure) from one evaporator to the next through the series is maintained by suitable pressure reducing valves 15. Thus the vapor pressure in this evaporator unit $VP_4$ is larger than that in the next stage $VP_5$. The flash tube 16 is a circular duct mounted against the inside of the circular sides of the evaporator. It is designed to utilize the fall in water vapor pressure (or the increase in vacuum) from stage to stage to impart a swirling motion to both the vapor phase (cyclone action) and the brine (vortex action) in the evaporator by discharging tangentially and above the residual liquid level into the body of the evaporator 17. The diameter and length of the flash tube of a particular evaporator unit depends upon the temperature at which the evaporator is designed to operate, upon its size and upon the drop in temperature experienced by the brine as it passes through the particular flash tube. This is also related to the fall in vapor pressure through the flash tube. The fall in vapor pressure associated with a unit drop in temperature is relatively larger at the higher than at the lower temperature end of the series of evaporators. The temperature and pressure at which the evaporator operates will determine the volume to which a unit weight of vapor will expand, partially in the flash tube and finally in the body of the evaporator. The diameter and length of the flash tube may therefore change from one evaporator to the next to produce the required discharge speeed and will depend upon the position of the evaporator in the series. It is to be understood that the flash tube 16 may also be located partially outside the evaporator and that it may also take the shape of a bent or looped tube designed to remove spray from the vapor phase by changing the direction of flow of vapor and entrained brine or spray either suddenly or gradually to effect such a separation. The hot brine inlet to the flash tube is through a valve 18 which is controlled to keep a constant volume of brine in the base of the evaporator during operation. Vapor and entrained brine ejects through the open end of the flash tube 17 into the body of the evaporator and sets up and maintains a swirling (cyclone) action in both the vapor phase and the brine. The main purposes of the flash tube are thus to remove entrained brine and spray from the vapor phase through centrifugal force and also to enhance the rate of heat exchange at both the condenser and base heater surfaces. A suitable annular baffle 19 prevents brine from splashing up the side walls toward the condenser area. The complete evaporator unit can be encased in a suitable thermal insulating cast moulded into two or more sections. The whole unit can be mounted on wheels and since all conduit connections to it are paired on opposite sides it can be wheeled into place for direct connection into the series. This design should simplify servicing and replacement of complete evaporator units. Since the condenser is one of the areas where deposits may tend to collect it is important that its design should allow it to be readily cleaned by brushing it out with a flexible brush (or roto-router type of implement) inserted through the tube ends 20 and 21. The interior of the evaporator is accessible for cleaning through its top when the conical lid 3 and its attached condensers 6 and 7 are lifted off. The flash tube 16 can then also be accessible for cleaning or can be readily replaced with a clean tube of the same dimensions.

In operation brine at elevated temperature enters the evaporator through the float valve 18 because the vacuum in the evaporator is maintained at a somewhat higher value (lower pressure) than the vapor pressure of the entering brine. As it enters and flows through the flash tube the brine will flash or boil spontaneously until its vapor pressure is substantially equal to the pressure maintained in the evaporator. Flashing is designed to take place mainly in the flash tube with a gradual fall in the brine vapor pressure and temperature as it proceeds through the flash tube. The vapor released in this process will expand under the influence of the existing vacuum thereby propelling vapor and entrained brine at accelerated speed through the length of the flash tube. Since there is a gradual drop in vapor pressure through the length of the flash tube evaporation will be gradual rather than instantaneous and this minimizes the amount of spray released into the vapor phase. Turbulence in the brine as it flows through the flash tube ensures a relatively complete removal of vapor from it.

There is also a tendency for the brine to spread as a film over the inside walls of the flash tube as it proceeds rapidly through it. This enhances both evaporation and the removal of spray from the vapor phase.

Separation of entrained spray and brine from the vapor phase starts inside the flash tube where, due to its circular shape the more dense liquid phase is centrifuged out of the vapor phase toward the outside wall of the flash tube. This separation is continued within the body of the evaporator where centrifugal force due to the cycline action will remove the heavier (liquid) phase and cause it to collect on the side wall of the evaporator from where it will flow down into the residual brine. This removal of spray by centrifugal force makes it possible to dispense with or simplify the spray or mist separators used conventionally to remove liquid phase from the vapor phase in flash distillation processes. Such separators usually take the form of wire mesh barriers through which the vapor phase is forced with a certain attendant loss in vapor pressure and efficiency. Omission of such a separator makes also this portion of the total fall in vapor pressure between the brine inlet valve and the condenser surface available for the distillation of additional vapor and thus adds to the thermal efficiency of the process.

Cyclone action in the vapor phase in contact with the condenser speeds up the rate of condensation due to turbulence and rapid heat exchange at the condenser surface. Thus the thermal efficiency of the condensation of vapor is enhanced and it adds to the thermal efficiency of the process as a whole.

As a result of the rapid tangential ejection of vapor and brine from the open end 17 of the flash tube 16 a swirling motion (vortex) will be set up in the brine in the base of the evaporator. This swirling action can be used to promote a rapid heat exchange to the brine from the base heat exchanger (4 and 5 in FIG. II) where heat contained in the distillate collected from stages operating at higher temperatures in the series is utilized to evaporate additional liquid. Because of the vortex action there will be an increase in pressure through the brine between the vortex surface and the base heater. The extra heat obtained from the base heater will therefore result in evaporation at or near the vortex surface rather than at the heating surface. The precipitation of sludge or salt from the brine due to this evaporation will therefore occur in the brine and the precipitate will remain in suspension rather than be deposited on the heating surface of the base heat exchanger. Thus the swirling (vortex action) both promotes thermal efficiency and acts as a scavenger for sludge and thereby reduces maintenance problems.

Since most of the evaporation takes place along the length of the flash tube deposits due to concentration of the brine will mainly precipitate from the brine in this area of high turbulence and/or fast linear movement which will tend to keep deposits in suspension rather than allow them to get attached to the walls of the flash tube.

The dynamic nature of this distillation process (cyclone and vortex action in vapor phase and brine respectively) allows evaporators to be relatively small when compared with conventional distillation processes designed to produce distilled water from sea water at an equal rate, thus economizing on material or construction cost.

The invention claimed is:

1. A flash evaporator comprising a vertical cylindrical outer shell with a conical bottom and a removable conical top, means for maintaining partial vacuum in the body of the evaporator, a base heat exchanger consisting in general of an inner cone concentric with the conical bottom and separated from it by a conical spiral strip draped over said inner cone and welded to it for the purpose of guiding the hot distillate collected from evaporator stages operating at higher temperatures in a spiral course between the two concentric cones of the base heat exchanger to ensure an effective heat transfer to the residual liquid in the body of the flash evaporator, a condenser suspended just below the conical top and consisting of a metal pipe bent in the shape of a conical spiral having its inlet and outlet ends extended through said conical top, open spiral-shaped through means disposed beneath the conical spiral-shaped condenser pipe for collecting distillate, a funnel-shaped means arranged beneath said condenser and communicating with said trough for the removal of collected distillate from the evaporator, a flash tube through which hot liquid is introduced into the body of the evaporator under force of the relative vacuum maintained in the flash evaporator and designed to utilize the fall in vapor pressure of the hot liquid together with the expansion under vacuum of its vapor both effective over the length of the flash tube to impart momentum to the vapor and its entrained residual liquid with the purpose of setting up and sustaining a swirling motion in both the vapor phase and the residual liquid in the body of the flash evaporator.

2. In a multi-stage flash evaporator series, a flash evaporator comprising a vertical cylindrical outer shell with a conical bottom and a removable conical top, means for maintaining partial vacuum in the evaporator, a base heat exchanger consisting in general of an inner cone concentric with the conical bottom and separated from it by a spiral separator strip designed to guide the hot distillate from previous and hotter stages in said evaporator series in a spiral course through the conical base heat exchanger, a condenser suspended from the conical top consisting of a metal pipe bent in the shape of a conical spiral with an open gutter of the same conical contour suspended close to and below said metal pipe to serve as a collecting means for distillate dripping from the condenser pipe and means for connecting said condenser by conduits protruding through the conical top of the evaporator in series to the condensers of other evaporators in the series, a funnel positioned centrally beneath the condenser to collect the distillate from the condenser and discharge it through a float controlled valve in the throat of said funnel to a suitable conduit for removal of said distillate under partial vacuum from the evaporator, a flash tube through which hot liquid is introduced into the body of the evaporator under force of the relative vacuum maintained in the flash evaporator and designed to utilize the fall in vapor pressure of the hot liquid together with the expansion under vacuum of its vapor both effective over the length of the flash tube to impart momentum to the vapor and its entrained residual liquid with the purpose of setting up and sustaining a swirling motion in both the vapor phase and the residual liquid in the body of the flash evaporator.

3. A flash evaporator comprising a vertical cylindrical outer shell with a conical bottom and a conical lid, means for maintaining partial vacuum in the evaporator, a base heat exchanger built into the bottom, a condenser suspended from the lid with conduit connections through the lid, a centrally located conduit and means for withdrawing the distillate collecting in said funnel from the evaporator, a flash tube bent in a circle to fit the cylindrical wall of the evaporator and which is attached to the inside of the cylindrical evaporator shell; said flash tube being provided with an inlet valve at its one end to control the flow of hot liquid through it while its opposite discharge end is open and is positioned so that the vapor and entrained liquid is ejected from it in an approximately horizontal direction tangentially within the cylindrical body of the evaporator at a height above the residual liquid level maintained in the base of the evaporator; said flash tube being of a length, cross section and shape designed to utilize the fall in vapor pressure of the hot liquid entering it through said inlet valve together with the expansion of the vapor flashing from said hot liquid under the influence of reduced pressure both dependent in magnitude on the operating temperature of the evaporator and both effective through the length of said flash tube to give momentum to the vapor and residual liquid in the flash tube so as to effect a partial separation of said liquid from said vapor by centrifugal force and to cause them to be ejected from the open end of the flash tube in a horizontal direction with sufficient speed to cause and maintain a whirling action in the vapor phase contained in the body of the evaporator and a swirling motion in the residual liquid in the base of the evaporator.

4. A flash evaporator comprising a vertical cylindrical outer shell with a conical bottom and a conical lid, means for maintaining partial vacuum in the evaporator, a base heat exchanger built into the bottom, a conical shaped condenser suspended from the lid with its conduit connections through the lid, means for delivering the distillate to a centrally located funnel supported on the end of a metal pipe through which the distillate collected by the funnel can be removed from the evaporator, a flash tube consisting of a curved metal duct fitted horizontally against the circular inside wall of the evaporator and which is fitted with a control valve at its one end through which hot liquid is introduced into the body of the evaporator at a rate controlled to keep the residual liquid in the base of the evaporator at a constant level; said flash tube being open at its other end and being designed to utilize the fall in vapor pressure and temperature of the hot liquid during its passage through the flash tube together with the expansion under vacuum of the vapor flashed from the hot liquid during said passage, both being dependent in magnitude upon the operating temperature of the evaporator, to give impetus to this vapor and this residual entrained liquid causing them to discharge from said open end of the flash tube in a horizontal tangential direction with sufficient speed to cause and maintain a whirling action in the vapor phase and a swirling motion in the residual liquid in the base of the evaporator, said whirling or cyclone action in the vapor phase being designed to remove entrained liquid phase or spray from the vapor phase by centrifugal force and also to promote the rate of heat exchange and thus the rate of vapor condensation at the condenser surface; said swirling motion in the residual liquid being designed to promote the rate of heat exchange at the base heat exchanger surface and to retain salts precipitated as a result of evaporation of liquid in suspension in the residual liquid.

5. A flash evaporator comprising a vertically disposed cylindrical vessel having an outwardly conically shaped bottom and an inwardly conically shaped top; means for evacuating said vessel; heat exchanger means comprising an inner conically shaped bottom spaced from said outwardly conically shaped bottom mounted in the bottom of said vessel for receiving hot distillate; condenser means mounted within the top of said vessel, said condenser means comprising conduit means arranged in spiral and downwardly conical configuration, means positioned beneath said condenser for collecting condensed vapors; an inlet conduit for liquids to be vaporized in the vertical wall of said vessel; a tube member of elongate circular shape within said vessel connected with said inlet on one end and open on the other end, said tube being of such dimensions and shape as to impose centrifugal forces on the liquid and vapor within said tube and sustain a swirling movement of said liquid and vapor after said liquid and vapor leaves said tube; and outlet means located in the bottom of said vessel for the removal of the liquid.

6. A flash evaporator system for the desalinization of saline containing water comprising a plurality of evaporator vessels connected in series; means for evacuating said vessels; heat exchange means comprising conically shaped conduits mounted within said vessels; condenser means within each of said vessels; means for collecting the condensate and passing said condensate through said heat exchange means of the next alternating vessels of said series and thereafter through said heat exchange means of each adjacent vessel in series and thence in heat exchange relationship with said charged saline containing water; inlet means connected with said vessels for the introduction of liquid to be desalinized, means comprising a circular shaped tubular member connected to said inlet means, said tubular member being mounted against the inside, circular side wall of the evaporator vessel and being open at its outer end for imposing centrifugal forces on the liquid and vapor within said means and sustaining a swirling motion of said liquid and vapor within said vessels; outlet means for the removal of and passing the unvaporized liquid to the inlet of each successive vessel in series.

7. An evaporation and condensation apparatus for liquids comprising a vessel; means for maintaining a suitable vapor pressure within said vessel; condenser means connected with said vessel for producing condensate; means for collecting and removing the condensate from said vessel; an elongate flash tube connected with said vessel, said flash tube having an inlet for introducing distilland thereinto, said flash tube being of enlarged diameter with respect to said inlet and having an open opposite end intermediate of said vessel for the ejection of vapor and liquid from said flash tube above the liquid collected in said vessel and effecting partial vaporization of said distilland, said flash tube comprising arcuate structure for imposing centrifugal forces on the vapor and liquid and maintaining a vapor pressure gradient therein; and an outlet connected with said vessel for removal of unevaporated liquid.

References Cited by the Examiner
UNITED STATES PATENTS

| 825,178 | 7/1906 | Barnstead | 202—203 X |
|---|---|---|---|
| 2,441,361 | 5/1948 | Kirgan. | |
| 2,733,196 | 1/1956 | Hillier et al. | |
| 2,994,647 | 8/1961 | Williamson et al. | 202—205 X |
| 3,080,300 | 3/1963 | Smith | 202—205 X |

NORMAN YUDKOFF, *Primary Examiner.*

F. E. DRUMMOND, *Assistant Examiner.*

UNITED STATES PATENT OFFICE
CERTIFICATE OF CORRECTION

Patent No. 3,285,832 November 15, 1966

Hugo H. Sephton

It is hereby certified that error appears in the above numbered patent requiring correction and that the said Letters Patent should read as corrected below.

Column 2, line 64, strike out "the", second occurrence; column 3, line 68, for "speeed" read -- speed --; column 4, line 27, for "condensers" read -- condenser --; line 61, for "cycline" read -- cyclone --; column 5, line 56, for "through" read -- trough --; column 6, line 34, for "conduit and means" read -- funnel and conduit means --; column 7, line 13, strike out "or cyclone".

Signed and sealed this 28th day of November 1967.

(SEAL)
Attest:

Edward M. Fletcher, Jr.            EDWARD J. BRENNER
Attesting Officer                  Commissioner of Patents